(12) United States Patent
Takatake (10) Patent No.: US 10,722,956 B2
(45) Date of Patent: Jul. 28, 2020

(54) END MILL AND METHOD OF MANUFACTURING MACHINED PRODUCT

(71) Applicant: KYOCERA CORPORATION, Kyoto-shi, Kyoto (JP)

(72) Inventor: Yuusaku Takatake, Higashiomi (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/072,536

(22) PCT Filed: Jan. 27, 2017

(86) PCT No.: PCT/JP2017/002980
§ 371 (c)(1),
(2) Date: Jul. 25, 2018

(87) PCT Pub. No.: WO2017/131173
PCT Pub. Date: Aug. 3, 2017

(65) Prior Publication Data
US 2019/0061022 A1 Feb. 28, 2019

(30) Foreign Application Priority Data
Jan. 27, 2016 (JP) ................................. 2016-013427

(51) Int. Cl.
*B23C 5/10* (2006.01)
(52) U.S. Cl.
CPC .......... *B23C 5/10* (2013.01); *B23C 2210/045* (2013.01); *B23C 2210/0457* (2013.01);
(Continued)

(58) Field of Classification Search
CPC ...... B23C 2210/045; B23C 2210/0457; B23C 2210/08; B23C 2210/285;
(Continued)

(56) References Cited

U.S. PATENT DOCUMENTS

| | | | | |
|---|---|---|---|---|
| 6,164,876 A | * | 12/2000 | Cordovano | ............... B23C 5/10 407/59 |
| 6,991,409 B2 | * | 1/2006 | Noland | ..................... B23C 5/10 407/59 |

(Continued)

FOREIGN PATENT DOCUMENTS

| | | |
|---|---|---|
| CN | 102398068 A | 4/2012 |
| CN | 103567522 A | 2/2014 |

(Continued)

*Primary Examiner* — Nicole N Ramos
(74) *Attorney, Agent, or Firm* — Viering, Jentschura & Partner MBB (57) ABSTRACT

An end mill includes an end mill body having a bar-shape extending along a rotation axis and including a first end and a second end, a side surface, a first end cutting edge, a second end cutting edge, a first peripheral cutting edge extending from the first end cutting edge, and a second peripheral cutting edge extending from the second end cutting edge. In which, L2 is smaller than L1, where L1 is a distance from the rotation axis to the first peripheral cutting edge, and L2 is a distance from the rotation axis to the second peripheral cutting edge in a cross section orthogonal to the rotation axis. And $\alpha 2$ is greater than $\alpha 1$, where $\alpha 1$ is a rake angle of the first peripheral cutting edge, and $\alpha 2$ is a rake angle of the second peripheral cutting edge.

17 Claims, 9 Drawing Sheets

(52) U.S. Cl.
CPC .... *B23C 2210/08* (2013.01); *B23C 2210/285* (2013.01); *B23C 2210/402* (2013.01); *B23C 2226/125* (2013.01); *B23C 2226/27* (2013.01)

(58) Field of Classification Search
CPC ........ B23C 2210/402; B23C 2226/125; B23C 2226/27; B23C 5/10
See application file for complete search history.

(56) References Cited

U.S. PATENT DOCUMENTS

| | | | | |
|---|---|---|---|---|
| 6,997,651 | B2* | 2/2006 | Kawai | B23C 5/10 407/53 |
| 8,007,209 | B2* | 8/2011 | Maushart | B23C 5/003 407/53 |
| 8,414,228 | B2* | 4/2013 | Wells | B23C 5/10 407/54 |
| 2002/0090273 | A1* | 7/2002 | Serwa | B23C 5/10 409/132 |
| 2006/0045638 | A1* | 3/2006 | Flynn | B23C 5/10 407/53 |
| 2014/0161546 | A1* | 6/2014 | Shpigelman | B23C 5/10 407/54 |

FOREIGN PATENT DOCUMENTS

| | | | | |
|---|---|---|---|---|
| DE | 102007034087 A1 | * | 1/2009 | .............. B23C 5/08 |
| JP | H037412 U | | 1/1991 | |
| JP | 2005096047 A | | 4/2005 | |

\* cited by examiner

END MILL AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2017/002980 filed on Jan. 27, 2017, which claims priority to Japanese Application No. 2016-013427 filed on Jan. 27, 2016, which are entirely incorporated herein by reference.

TECHNICAL FIELD

The present disclosure relates to an end mill and a method of manufacturing a machined product.

BACKGROUND

An end mill includes end cutting edges and peripheral cutting edges and is used, for example, in a grooving process and a shouldering process of a workpiece. For example, Japanese Unexamined Patent Publication No. 2005-096047 (Patent Document 1) discloses a 4-flute end mill including a pair of major cutting edges and a pair of minor cutting edges. The minor cutting edges are disposed at positions at an angular distance of 90° relative to the major cutting edges. The minor cutting edges have a smaller diameter than the major cutting edges.

Recently, however, there is a need for an end mill with which a smooth cut-off surface can be obtained by reducing machining residue that is likely to occur on a machined surface.

SUMMARY

In an embodiment of the disclosure, an end mill includes a bar-shaped end mill body including a rotation axis, a first end, and a second end. The end mill body includes a first end cutting edge, a second end cutting edge, a first peripheral cutting edge, and a second peripheral cutting edge. The first end cutting edge is located at a side of the first end. The second end cutting edge is located at a side of the first end. The first peripheral cutting edge extends from the first end cutting edge and is located on a side surface of the end mill body. The second peripheral cutting edge extends from the second end cutting edge and is located on the side surface of the end mill body. An L2 is smaller than L1, where L1 is a distance from the rotation axis to the first peripheral cutting edge, and L2 is a distance from the rotation axis to the second peripheral cutting edge in a cross section orthogonal to the rotation axis. An α2 is greater than α1, where α1 is a rake angle of the first peripheral cutting edge, and α2 is a rake angle of the second peripheral cutting edge.

DETAILED DESCRIPTION

Figure 1:
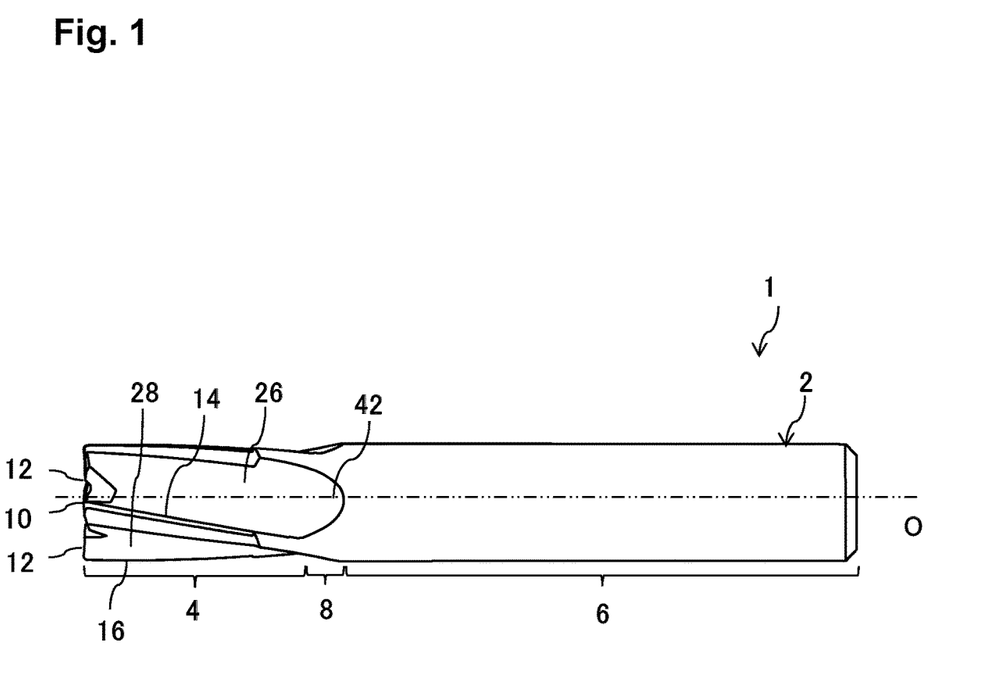
FIG. 1 is a side view illustrating an end mill in one of embodiments.
Figure 2:
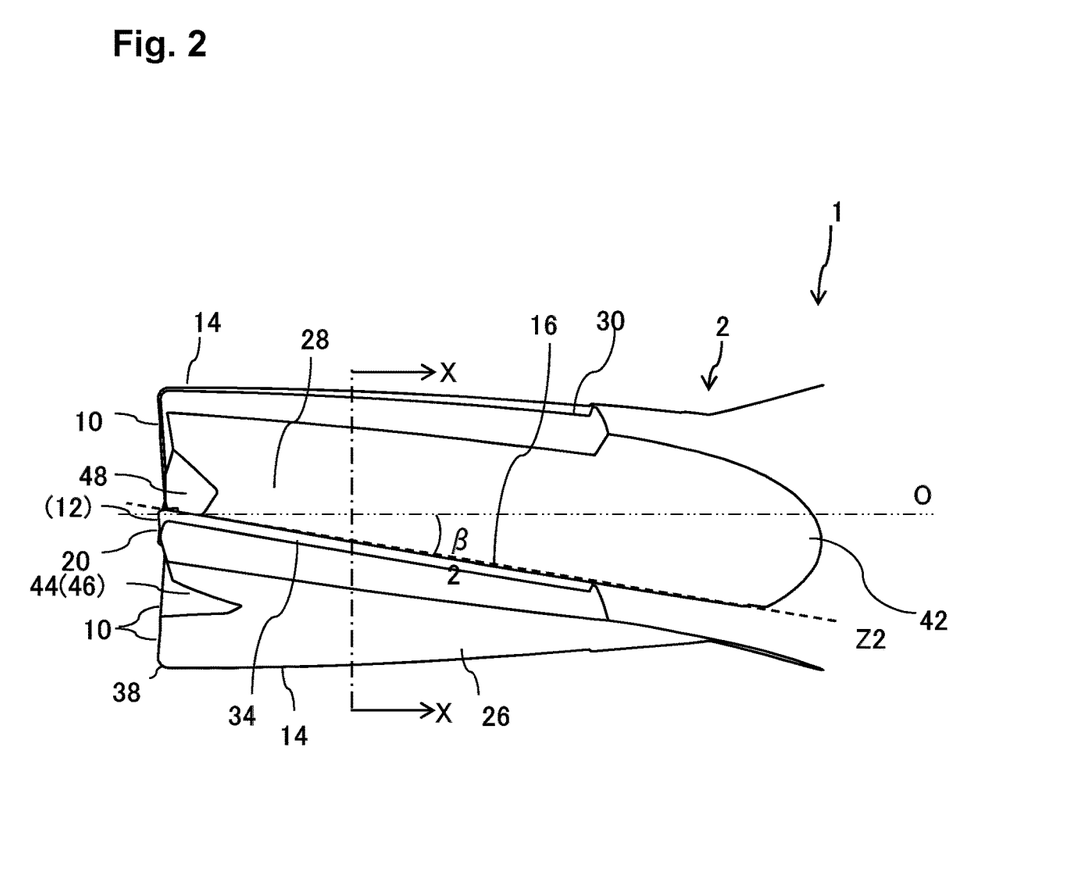
FIG. 2 is an enlarged view at a side of a first end of the end mill illustrated in FIG. 1, specifically, a side view of a state in which a second end cutting edge is projected on a rotation axis.
Figure 3:
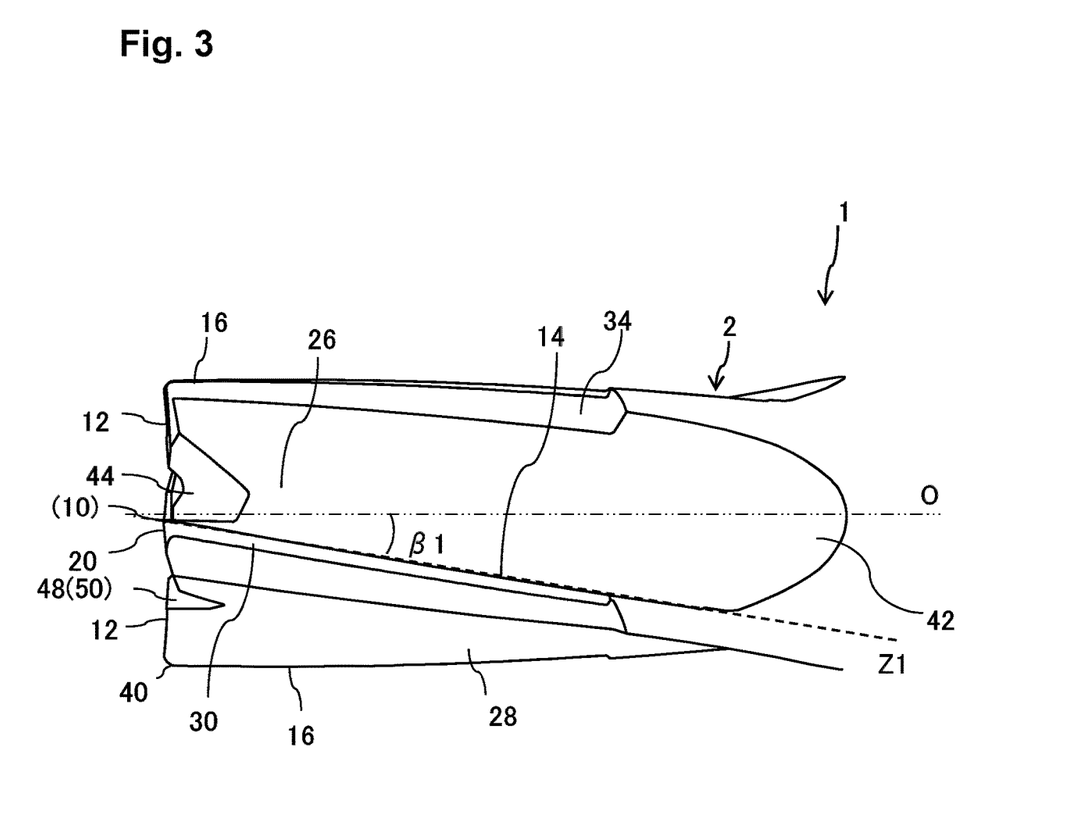
FIG. 3 is a diagram when the end mill illustrated in FIG. 2 is rotated 90°, specifically, a side view in which a first end cutting edge is projected on the rotation axis.

An end mill 1 illustrated in FIGS. 1 to 8 is a solid end mill and includes an end mill body 2 having a rotation axis O indicated by a broken line in FIGS. 1 to 3. The end mill body 2 has a bar shape having a first end (a left side in FIG. 1) and a second end (a right side in FIG. 1). The end mill body 2 includes a cutting part 4 on a side of the first end of the end mill body 2, and a shank part 6 on a side of the second end of the end mill body 2. FIG. 1 illustrates an embodiment in which a root part 8 is located between the cutting part 4 and the shank part 6.

A part of the end mill 1 which includes at least the cutting part 4 is composed of a hard material, such as cemented carbide, cermet, and cBN. The end mill 1 may be one which has a coating layer on a surface of a hard material. The end mill body 2 has an approximately circular cylindrical shape with a diameter D around a rotation axis O. The end mill 1 is designed so that a side of the second end in the shank part 6 is held by a cutting machine (not illustrated).

As illustrated in FIGS. 1 to 3, the end mill body 2 includes a first end cutting edge 10, a second end cutting edge 12, a first peripheral cutting edge 14, and a second peripheral cutting edge 16. The first end cutting edge 10 and the second end cutting edge 12 are located at a side of the first end. In other words, the first end cutting edge 10 and the second end cutting edge 12 are located close to the first end. The first peripheral cutting edge 14 extends from the first end cutting edge 10 toward a side of the second end, and is located on a side surface of the end mill body 2. The second peripheral cutting edge 16 extends from the second end cutting edge 12 toward a side of the second end, and is located on the side surface of the end mill body 2.

Figure 4:
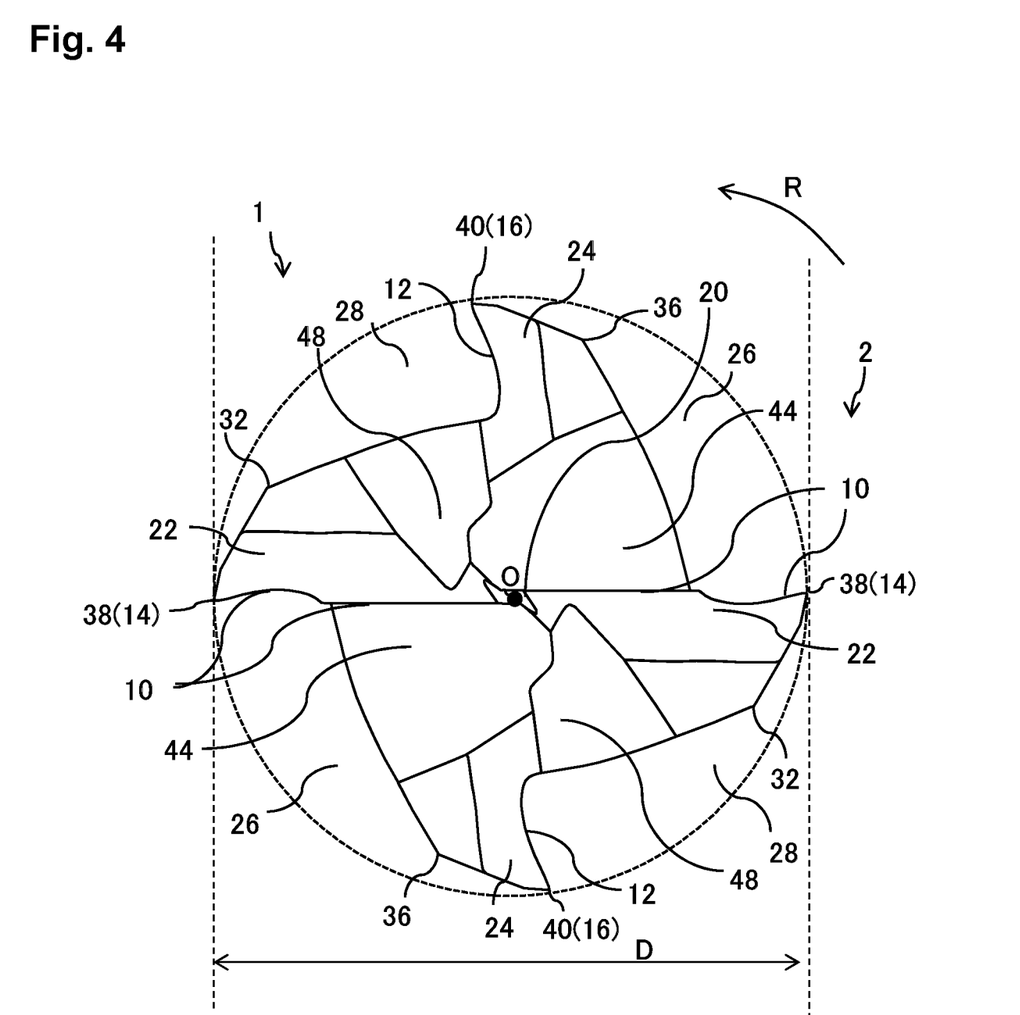
FIG. 4 is a front view when the end mill illustrated in FIG. 1 is viewed toward the first end.
Figure 5:
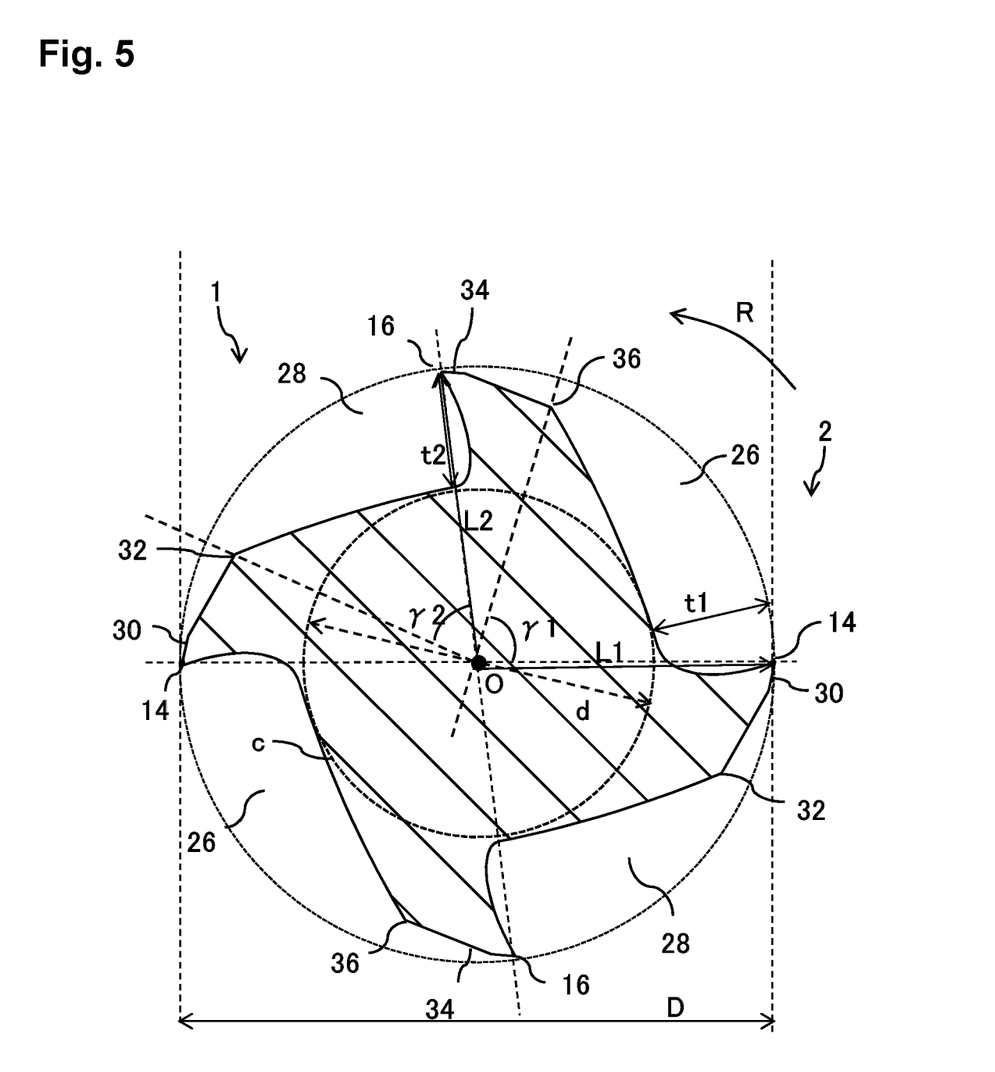
FIG. 5 is a sectional view of the end mill illustrated in FIG. 2, taken along line X-X.

With reference to FIGS. 4 and 5, the first peripheral cutting edge 14 and the second peripheral cutting edge 16 are disposed alternately along an outer periphery of the end mill body 2. In the drawings of the present embodiment, ones which are not illustrated in the drawings but indicate positions are put in parenthesis. In FIGS. 4 and 5, a dotted line circular arc indicates a rotational track of the first peripheral cutting edge 14. FIG. 5 illustrates a cross section orthogonal to the rotation axis O.

Figure 6:
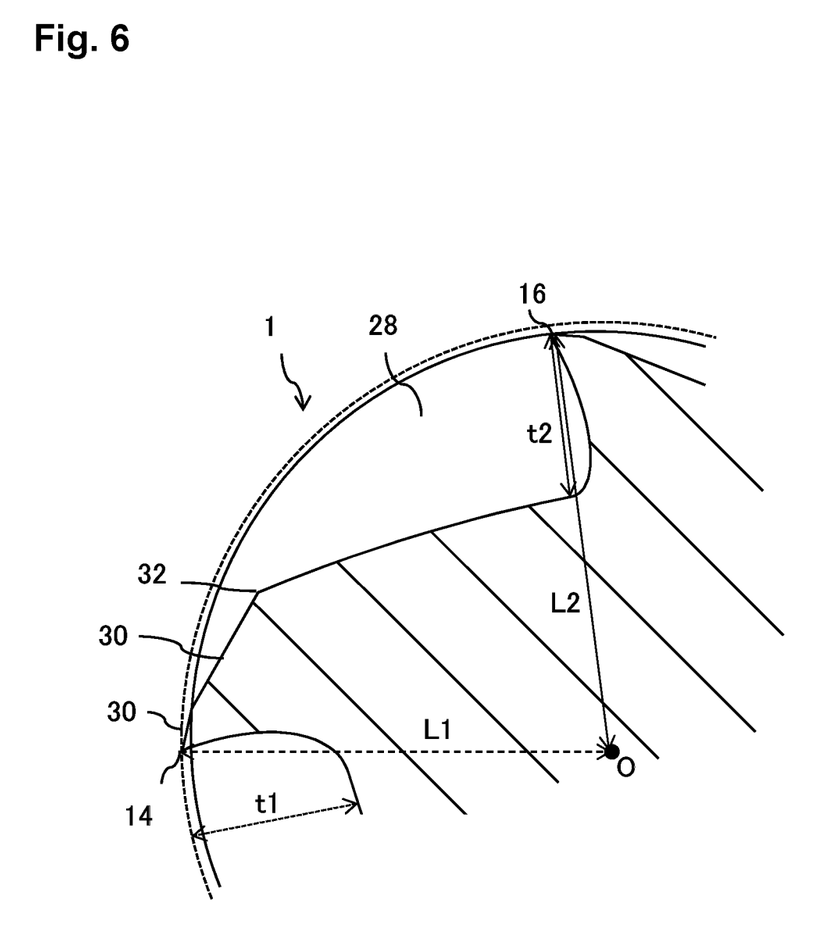
FIG. 6 is an enlarged view of a main part of the end mill illustrated in FIG. 5.

In the present embodiment, a dotted line circular arc indicates a rotational track of the first peripheral cutting edge 14, and a solid line circular arc indicates a rotational track of a second peripheral cutting edge 16 in FIG. 6, which is a partially enlarged view of FIG. 5. As illustrated in FIG. 6, a distance L2 from the rotation axis O to the second peripheral cutting edge 16 is smaller than a distance L1 from the rotation axis O to the first peripheral cutting edge 14. A rake angle α2 of the second peripheral cutting edge 16 illustrated in FIG. 8 is greater than a rake angle α1 of the first peripheral cutting edge 14 illustrated in FIG. 7.

Thus, even when machining a workpiece that tends to cause fibrous machining residue, such as carbon fiber reinforced plastics (CFRP), the second peripheral cutting edge 16 has a relatively large rake angle and has good cutting performance, thereby reducing machining residue that is apt to occur on a machined surface. It is consequently possible to obtain a smooth cut-off surface by a cutting process having high cutting efficiency and causing less machining residue. Additionally, because the second peripheral cutting edge 16 has a smaller machining allowance, cutting resistance exerted on the second peripheral cutting edge 16 becomes small. Therefore, the second peripheral cutting edge 16 is less likely to be fractured even when the second peripheral cutting edge 16 has a large rake angle α2.

In the cutting process using the end mill 1 of the present embodiment, both the first peripheral cutting edge 14 and the second peripheral cutting edge 16 are designed to cut off the workpiece by being brought into contact with a workpiece. Here, because the distance L1 from the rotation axis O to the first peripheral cutting edge 14 is greater than the distance L2 from the rotational axis O to the second peripheral cutting edge 16, an amount of chips generated during cutting-off with the first peripheral cutting edge 14 is greater than an amount of chips generated during cutting-off with the second peripheral cutting edge 16.

When a ratio L2/L1 of the distance L1 from the rotation axis O to the first peripheral cutting edge 14 and the distance L2 from the rotation axis O to the second peripheral cutting edge 16 is 0.965-0.998 in the present embodiment, it is possible to optimize an amount of cutting-off with the first peripheral cutting edge 14 and the second peripheral cutting edge 16. It is also possible to enhance fracture resistance of the first peripheral cutting edge 14 and the second peripheral cutting edge 16.

Figure 7:
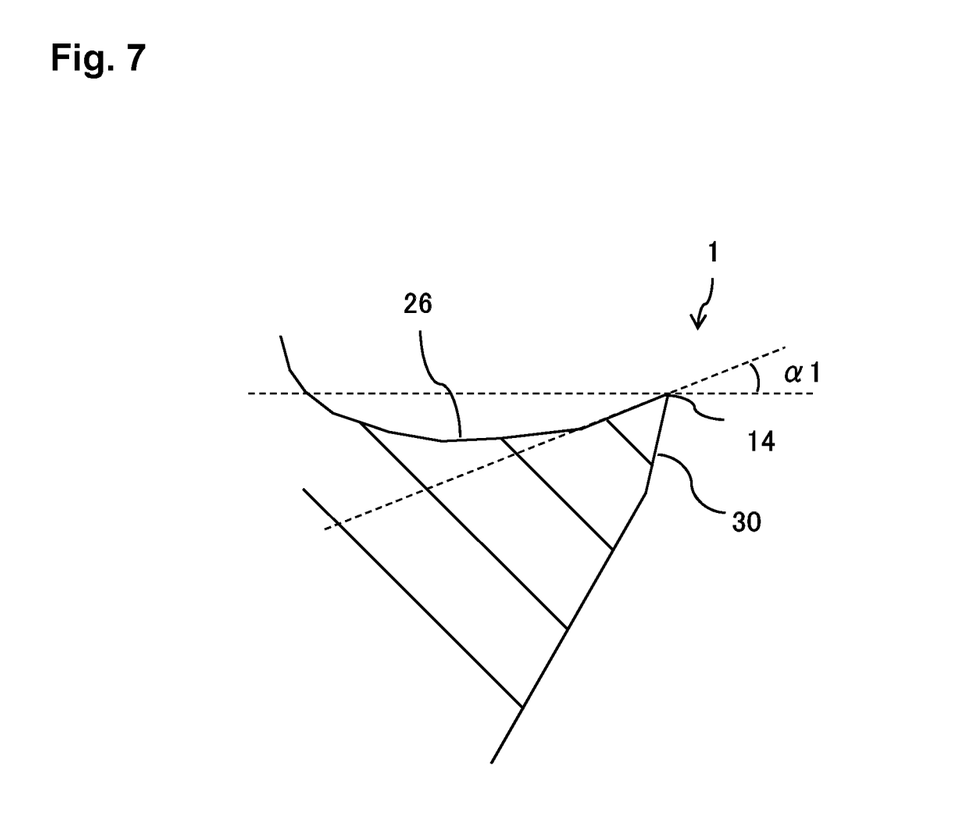
FIG. 7 is an enlarged view of the vicinity of a first peripheral cutting edge of the end mill illustrated in FIG. 5.
Figure 8:
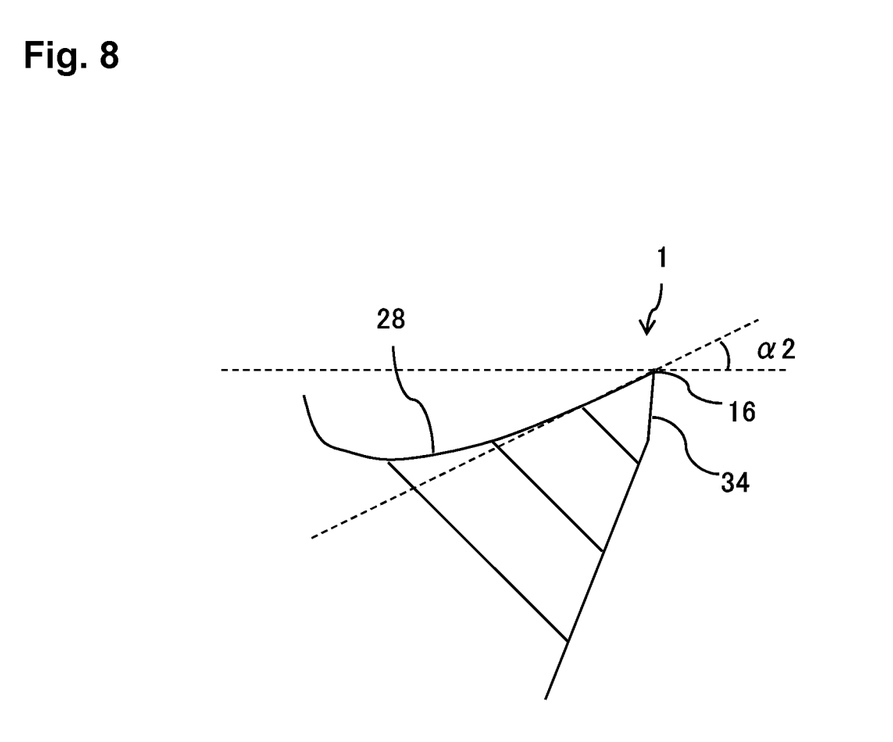
FIG. 8 is an enlarged view of the vicinity of a second peripheral cutting edge of the end mill illustrated in FIG. 5.

In the present embodiment, a rake angle α1 of the first peripheral cutting edge 14 as illustrated in FIG. 7 is 10-25°, and a rake angle α2 of the second peripheral cutting edge 16 as illustrated in FIG. 8 is 15-35°. When the rake angle α1 is 12-18° and the rake angle α2 is 21-30°, it is possible to enhance the fracture resistance of the first peripheral cutting edge 14 and the second peripheral cutting edge 16. Also when a ratio α1/α2 of rake angle is 0.5-0.8, it is possible to enhance the fracture resistance of the first peripheral cutting edge 14 and the second peripheral cutting edge 16.

The end mill body 2 includes at least one first end cutting edge 10 and at least one second end cutting edge 12, each of which extends from a side of the rotation axis O located at a center of the end mill body 2 toward the outer periphery. In FIG. 4, the end mill body 2 includes a pair of the first end cutting edges 10 and a pair of the second end cutting edges 12, and the first end cutting edges 10 and the second end cutting edges 12 are disposed alternately along the rotation direction R of the rotation axis O. A first end flank surface 22 is located at a backward side in the rotation direction R with respect to the first end cutting edge 10, and a second end flank surface 24 is located at a backward side in the rotation direction R with respect to the second end cutting edge 12.

The end mill body 2 in the present embodiment includes a chisel part 20 located at the first end. The end mill body 2 also includes the two first end cutting edges 10 and the two second end cutting edges 12. As illustrated in FIGS. 2 to 4, the chisel part 20 includes the rotation axis O. The first end cutting edges 10 are located at a side of the first end in the cutting part 4.

As illustrated in FIG. 4, the first end cutting edges 10 extend from the chisel part 20 toward the outer periphery in a front end view. The two first end cutting edges 10 are disposed at point symmetric positions with the rotation axis O as a center of symmetry. The first end cutting edges 10 are end cutting edges referred to as long cutting edges. Here, the term "front end view" denotes a state viewing toward the first end.

The second end cutting edges 12 are respectively disposed between the two first end cutting edges 10 in a circumferential direction of the rotation axis O. The second end cutting edges 12 extend from positions away from the chisel part toward the outer periphery. From another point of view, the second end cutting edges 12 extend from the outer periphery toward the rotation axis O. The second end cutting edges 12 are end cutting edges referred to as short cutting edges.

In the present disclosure, the first end cutting edges 10 may not necessarily be the long cutting edges, and the second end cutting edges 12 may not necessarily be the short cutting edges. When the end mill 1 includes the long cutting edges and the short cutting edges, it is possible to smoothen a bottom surface subjected to the cutting process with the end mill 1.

Although the two second end cutting edges 12 are disposed in FIG. 4, the number of the second end cutting edges 12 may be one, or alternatively, may be three or more. A well-balanced cutting load is exerted on the end mill 1 during the cutting process when there exists an even number of the second end cutting edges 12 and the second end cutting edges 12 are disposed at the point symmetric positions with the rotation axis O as the center of symmetry.

As illustrated in FIG. 5, the end mill body 2 includes a first peripheral flute 26 located at a forward side in the rotation direction R of the rotation axis O with respect to the first peripheral cutting edge 14, and a second peripheral flute 28 located at a forward side in the rotation direction R of the rotation axis O with respect to the second peripheral cutting edge 16. The first peripheral cutting edges 14 are peripheral cutting edges respectively extending from the first end cutting edges 10 that are the long cutting edges. When an opening angle γ1 of the first peripheral flute 26 is greater than an opening angle γ2 of the second peripheral flute 28, chip discharge performance is less likely to degrade due to chip clogging in the first peripheral flute 26 even when a machining allowance of the first peripheral cutting edge 14 is greater than a machining allowance of the second peripheral cutting edge 16.

As illustrated in FIGS. 2 and 3, a first corner 38, which is an outer peripheral end of the first end cutting edge 10, also functions as a cutting edge when the first peripheral cutting edge 14 and the first end cutting edge 10 connect smoothly at the first corner 38. A second corner 40, which is an outer peripheral end of the second end cutting edge 12, also functions as a cutting edge when the second peripheral cutting edge 16 and the second end cutting edge 12 connect smoothly at the second corner 40.

As illustrated in FIG. 5, the end mill body 2 includes a first heel 32 at a backward side in the rotation direction R with respect to a first peripheral flank surface 30, and a second heel 36 at a backward side in the rotation direction R with respect to a second peripheral flank surface 34.

As illustrated in FIG. 5, the first heel 32 is an intersection of the second peripheral flute 28, which is adjacent to the first peripheral flank surface 30 at a backward side in the rotation direction R, and the first peripheral flank surface 30. The second heel 36 is an intersection of the second peripheral flute 26, which is adjacent to the second peripheral flank surface 34 at a backward side in the rotation direction R, and the second peripheral flank surface 34.

As illustrated in FIG. 5, the opening angle γ1 of the first peripheral flute 26 is an angle formed by a straight line passing through the rotation axis O and the second heel 36, and a straight line passing through the rotation axis O and the first peripheral cutting edge 14. The opening angle γ2 of the second peripheral flute 26 is an angle formed by a straight line passing through the rotation axis O and the first heel 32, and a straight line passing through the rotation axis O and the second peripheral cutting edge 16.

In a non-limiting aspect of the disclosure, a range of the opening angle γ1 is 30-80° when the number of the first peripheral cutting edge 14 and the first peripheral flute 26 is two, the range of the opening angle γ1 is 20-50° when the number thereof is three, and the range of the opening angle γ1 is 15-40° when the number thereof is four. When the opening angle γ1 falls within the above ranges, chips are less likely to be caught in the first peripheral flute 26, and the chips are less likely to come out from the inside of the first peripheral flute 26.

Good chip discharge performance is ensured when a ratio γ1/γ2 of the opening angle γ1 of the first peripheral flute 26 and the opening angle γ2 of the second peripheral flute 28 is 1.1-1.3 in the present embodiment.

FIGS. 1 to 3 illustrate an embodiment in which the first peripheral cutting edges 14 and the second peripheral cutting edges 16 are twisted relative to the rotation axis O, and are located spirally along the outer periphery of the end mill body 2. A helix angle β1 of the first peripheral cutting edge 14 with respect to the rotation axis O is identical with a helix angle β2 of the second peripheral cutting edge 16 with respect to the rotation axis O in the present embodiment.

The present disclosure is not limited to the above. For example, the helix angle β2 may be greater than the helix angle β1. This leads to further improvement in cutting performance of the second peripheral cutting edges 16, thereby further reducing the machining residue. The helix angle β1 of the first peripheral cutting edge 14 with respect to the rotation axis O is 5-25°, and the helix angle β2 of the second peripheral cutting edge 16 with respect to the rotation axis O is 7-30°.

Here, the helix angle β1 is an angle formed by the rotation axis O and a tangent line Z1 at an intersection of the first peripheral cutting edge 14 and the rotation axis O, and the helix angle β2 is an angle formed by the rotation axis O and a tangent line Z2 at an intersection of the second peripheral cutting edge 16 and the rotation axis O.

A peripheral land part (not illustrated) may be disposed along the outer periphery of the end mill body 2. The peripheral land part is adjacent to the first peripheral cutting edge 14 at a backward side in the rotation direction R, and has the same distance from the rotation axis O as the first peripheral cutting edge 14. A peripheral land part (not illustrated) may also be disposed similarly. The peripheral land part is adjacent to the second peripheral cutting edge 16 at a backward side in the rotation direction R, and has the same distance from the rotation axis O as the second peripheral cutting edge 16.

As illustrated in FIG. 1, the first peripheral flute 26 and the second peripheral flute 28 extend spirally from a side of the first end in the cutting part 4 to a side of the root part 8. The root part 8 includes a raised part 42. The raised part 42 extends from the first peripheral flute 26 and the second peripheral flute 28 in the cutting part 4, and reduces a depth of the first peripheral flute 26 and a depth of the second peripheral flute 28.

The end mill 1 is 0.5-0.8 in ratio d/D of a core thickness d to a diameter D of the end mill body 2 in a cross section as illustrated in FIG. 5. When the ratio d/D falls within this range, the end mill 1 has high strength, and the end mill 1 is less likely to be fractured. The core thickness d is prescribed by a diameter of a largest circle c drawn at a central part of the end mill 1 in FIG. 5. The core thickness d is equal to twice a distance between the rotation axis O and a deepest position of the peripheral flute.

Chip discharge performance in both the first peripheral flute 26 and the second peripheral flute 28 can be improved when t1 is smaller than t2, where t1 is a flute depth of the first peripheral flute 26, and t2 is a flute depth of the second peripheral flute 28 as illustrated in FIG. 5. In particular, when a ratio t1/t2 is 0.940-0.998, the chip discharge performance in both the first peripheral flute 26 and the second peripheral flute 28 can be further improved.

Here, the flute depth t1 of the first peripheral flute 26 in the present embodiment denotes a greatest depth in depth from a circular arc passing through the first peripheral cutting edge 14 to the first peripheral flute 26 as illustrated in FIG. 5, specifically, a distance from a deepest portion to the circular arc on a straight line passing through the rotation axis O and the deepest portion. Similarly, the flute depth t2 of the second peripheral flute 28 denotes a greatest depth in depth from a circular arc passing through the second peripheral cutting edge 16 to the second peripheral flute 28 as illustrated in FIG. 5.

As illustrated in FIGS. 2 to 4, the end mill body 2 may include a first gash 44 adjacent to the first end cutting edge 10 and located between the first end cutting edge 10 and the first peripheral flute 26. When the end mill body 2 includes the first gash 44, a planar first end rake surface 46 is formed between the first end cutting edge 10 and the first peripheral flute 26 as illustrated in FIG. 2.

The end mill body 2 may also include a second gash 48 adjacent to the second end cutting edge 12 and located between the second end cutting edge 12 and the second peripheral flute 28. When the end mill body 2 includes the second gash 48, a planar second end rake surface 50 is formed between the second end cutting edge 12 and the second peripheral flute 28 as illustrated in FIG. 3.

A region, which is located at an intersection part of the first end rake surface 46 and the first end flank surface 22 and extends from the rotation axis O toward a side of the outer periphery, is also included in the first end cutting edge 10. A region, which is located at an intersection part of the second end rake surface 50 and the second end flank surface 24, and extends from the rotation axis O toward a side of the outer periphery, is also included in the second end cutting edge 12.

Arrangement of the first end cutting edge 10 and the second end cutting edge 12 has an asymmetric shape when at least one of the first end cutting edge 10 and the second end cutting edge 12 is subjected to unequal spacing so as not to have a point symmetric shape with another cutting edge. Thus, chatter vibration is less likely to occur due to resonance of the end mill 1 during the cutting process. Besides employing the asymmetric arrangement of the first end cutting edge 10 and the second end cutting edge 12, it is possible to employ a method of changing the helix angle of either one of the first peripheral cutting edge 14 and the second peripheral cutting edge 16.

Although the first peripheral flute 26, the first peripheral cutting edge 14, the second peripheral flute 28, and the second peripheral cutting edge 16 are arranged repetitively in this order by the number of the peripheral cutting edges in a direction toward a backward side in the rotation direction R in the present embodiment, there is no intention to limit thereto. In other words, the number of either one of the first peripheral flutes 26 and the first peripheral cutting edges 14, and the number of either one of the second peripheral flutes 28 and the second peripheral cutting edges 16 may be smaller than the number of the other.

With the end mill 1 of the present embodiment, the cutting edges can be reproduced by repolishing. Specifically, the first end cutting edges 10 and the first peripheral cutting edges 14 can be reproduced by a repolishing process of the first end flank surface 22 and a repolishing process of the first gash 44 including the first end rake surface 46. Similarly, the second end cutting edges 12 and the second peripheral cutting edges 16 can be reproduced by a repolishing process of the second end flank surface 24 and a repolishing process of the second gash 44 including the second end rake surface 50.

<Method of Manufacturing Machined Product>

A method of manufacturing a machined product in the present embodiment is described below with reference to FIG. 9A-9C.

Figure 9A:
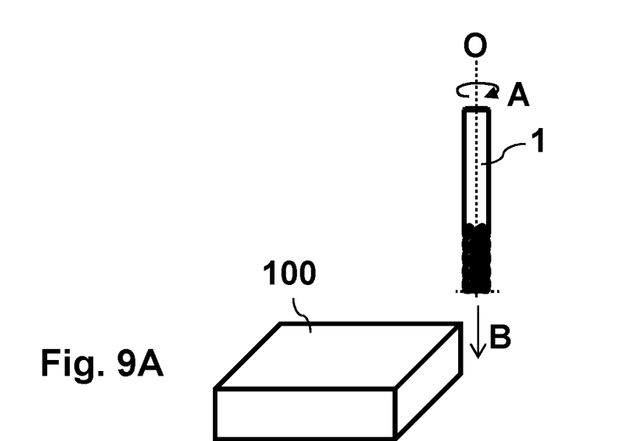
FIG. 9A-9C show a schematic diagram illustrating a method of manufacturing a machined product in one of embodiments.
Figure 9B:
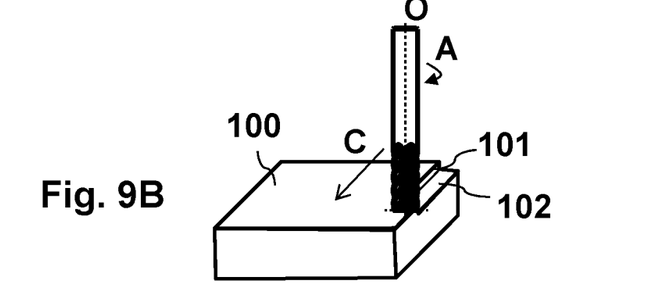
Figure 9C:
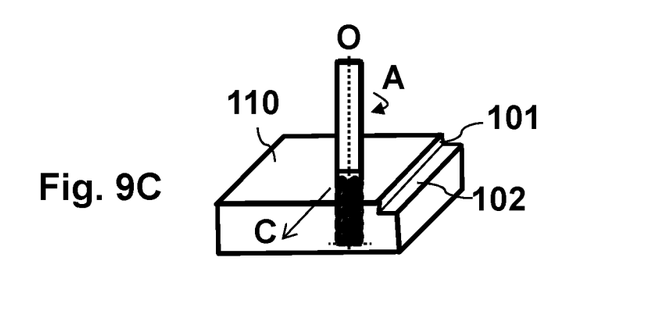

FIG. 9A-9C show a schematic diagram illustrating a method of manufacturing a machined product which includes a shouldering process of a workpiece by using the end mill 1 in FIG. 1. In the present embodiment, the end mill 1 attached to an arbor (not illustrated) is brought near the workpiece 100 by moving the end mill 1 in an arrow B direction while rotating the end mill 1 in an arrow A direction with reference to the rotation axis O of the end mill 1 as illustrated in FIG. 9A.

Subsequently, the end mill 1 being rotated is brought into contact with a surface of the workpiece 100 as illustrated in FIG. 9B. Specifically, the end mill 1 being rotated is moved in an arrow C direction while being brought into contact with the workpiece 100. Thus, a cut-off surface of the workpiece 100 after being cut off by the peripheral cutting edges becomes a side cut-off surface 101. A cut-off surface of the workpiece 100 after being cut off by the end cutting edges becomes a bottom cut-off surface 102.

As illustrated in FIG. 9C, by moving the end mill 1 as it is in the arrow C direction so as to move the end mill 1 away from the workpiece 100, a cutting process is terminated and a desired machined product 110 is obtainable. The machined product 110 with excellent machining surface accuracy is obtainable because the end mill 1 has the excellent cutting performance for the reasons described above.

When the cutting process is continued, it is necessary to repeat the step of bringing the cutting edges of the end mill 1 into contact with different portions of the workpiece 100 while keeping the end mill 1 rotating. Although the end mill 1 is brought near the workpiece 100 in the present embodiment, the end mill 1 and the workpiece 100 need to be relatively brought near. For example, the workpiece 100 may be brought near the end mill 1. This is also true for the step of moving the end mill 1 away from the workpiece 100.

While the embodiments of the present disclosure have been described and illustrated above, the present disclosure is not limited to the foregoing embodiments. It is, of course, possible to make any arbitrary ones insofar as they do not depart from the gist of the present disclosure.

DESCRIPTION OF REFERENCE NUMERALS 1 end mill
2 end mill body
4 cutting part
6 shank part
8 root part
10 first end cutting edge
12 second end cutting edge
14 first peripheral cutting edge
16 second peripheral cutting edge
20 chisel part
22 first end flank surface
24 second end flank surface
26 first peripheral flute
28 second peripheral flute
30 first peripheral flank surface
32 first heel
34 second peripheral flank surface
36 second heel
38 first corner
40 second corner
42 raised part
44 first gash
46 first end rake surface
48 second gash
50 second end rake surface
O rotation axis
D core thickness
L1 distance from rotation axis to first peripheral cutting edge
L2 distance from rotation axis to second peripheral cutting edge
α1 rake angle of first peripheral cutting edge
α2 rake angle of second peripheral cutting edge
β1 helix angle of first peripheral cutting edge
β2 helix angle of second peripheral cutting edge
γ1 opening angle of first peripheral flute
γ2 opening angle of second peripheral flute
t1 flute depth of first peripheral flute
t2 flute depth of second peripheral flute

What is claimed is:
1. An end mill, comprising:
an end mill body having a bar-shape extending along a rotation axis and comprising:
a first end,
a second end,
a side surface,
a pair of first end cutting edges located at a side of the first end,
a pair of second end cutting edges located at a side of the first end,
a chisel part which is located at the first end and intersects the rotation axis,
a first peripheral cutting edge extending from the first end cutting edges and being located on the side surface, and
a second peripheral cutting edge extending from the second end cutting edges and being located on the side surface, wherein
the pair of the first end cutting edges and the pair of the second end cutting edges are located alternately along a rotation direction of the rotation axis,
the first end cutting edges extend from the chisel part toward an outer periphery in a front end view,
the second end cutting edges extend from a position away from the chisel part toward the outer periphery,
L2 is smaller than L1, where the L1 is a distance from the rotation axis to the first peripheral cutting edge, and the

L2 is a distance from the rotation axis to the second peripheral cutting edge in a cross section orthogonal to the rotation axis, and α2 is greater than α1, where the α1 is a rake angle of the first peripheral cutting edge, and the α2 is a rake angle of the second peripheral cutting edge.

2. The end mill according to claim 1, wherein a ratio L2/L1 of the L1 and the L2 is 0.965-0.998.

3. The end mill according to claim 1, wherein a ratio α1/α2 of the α1 and the α2 is 0.5-0.8.

4. The end mill according to claim 1, wherein the end mill body further comprises
   a first peripheral flute located at a forward side in a rotation direction of the rotation axis with respect to the first peripheral cutting edge, and
   a second peripheral flute located at a forward side in the rotation direction with respect to the second peripheral cutting edge, and
γ1 is larger than γ2, where the γ1 is an opening angle of the first peripheral flute, and the γ2 is an opening angle of the second peripheral flute.

5. The end mill according to claim 4, wherein t1 is smaller than t2, where the t1 is a depth of the first peripheral flute, and the t2 is a depth of the second peripheral flute.

6. The end mill according to claim 1, wherein β1 is smaller than β2, where the β1 is a helix angle of the first peripheral cutting edge, and the β2 is a helix angle of the second peripheral cutting edge.

7. A method of manufacturing a machined product, comprising:
   rotating the end mill according to claim 1;
   bringing the end mill being rotated into contact with a workpiece; and
   moving the end mill away from the workpiece.

8. The end mill according to claim 4, wherein a ratio γ1/γ2 of γ1 and γ2 is 1.1-1.3.

9. An end mill, comprising:
   an end mill body having a bar-shape extending along a rotation axis and comprising:
      a first end,
      a second end,
      a side surface,
      a first end cutting edge located at a side of the first end,
      a second end cutting edge located at a side of the first end,
      a first peripheral cutting edge extending from the first end cutting edge and being located on the side surface, and
      a second peripheral cutting edge extending from the second end cutting edge and being located on the side surface, wherein
   L2 is smaller than L1, where the L1 is a distance from the rotation axis to the first peripheral cutting edge, and the L2 is a distance from the rotation axis to the second peripheral cutting edge in a cross section orthogonal to the rotation axis, and
   α2 is greater than α1, where the α1 is a rake angle of the first peripheral cutting edge, the α2 is a rake angle of the second peripheral cutting edge, and both α1 and α2 have a positive value.

10. The end mill according to claim 9, wherein a ratio L2/L1 of the L1 and the L2 is 0.965-0.998.

11. The end mill according to claim 9, wherein a ratio α1/α2 of the α1 and the α2 is 0.5-0.8.

12. The end mill according to claim 9, wherein the end mill body comprises a pair of the first end cutting edges, a pair of the second end cutting edges, and a chisel part which is located at the first end and intersects the rotation axis,
the pair of the first end cutting edges and the pair of the second end cutting edges are located alternately along a rotation direction of the rotation axis,
the first end cutting edges extend from the chisel part toward an outer periphery in a front end view, and
the second end cutting edges extend from a position away from the chisel part toward the outer periphery.

13. The end mill according to claim 9, wherein the end mill body further comprises
   a first peripheral flute located at a forward side in a rotation direction of the rotation axis with respect to the first peripheral cutting edge, and
   a second peripheral flute located at a forward side in the rotation direction with respect to the second peripheral cutting edge, and
γ1 is larger than γ2, where the γ1 is an opening angle of the first peripheral flute, and the γ2 is an opening angle of the second peripheral flute.

14. The end mill according to claim 13, wherein a ratio γ1/γ2 of γ1 and γ2 is 1.1-1.3.

15. The end mill according to claim 13, wherein t1 is smaller than t2, where the t1 is a depth of the first peripheral flute, and the t2 is a depth of the second peripheral flute.

16. The end mill according to claim 9, wherein β1 is smaller than β2, where the β1 is a helix angle of the first peripheral cutting edge, and the β2 is a helix angle of the second peripheral cutting edge.

17. A method of manufacturing a machined product, comprising:
   rotating the end mill according to claim 9;
   bringing the end mill being rotated into contact with a workpiece; and
   moving the end mill away from the workpiece.

* * * * *